United States Patent
Meiyyappan et al.

(10) Patent No.: US 7,725,902 B2
(45) Date of Patent: May 25, 2010

(54) FINER GRAINED POINT-TO-POINT EVENT PROPAGATION

(75) Inventors: Krishnan Meiyyappan, Fremont, CA (US); Ramkumar Venkatesan, Foster City, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1268 days.

(21) Appl. No.: 11/224,918

(22) Filed: Sep. 12, 2005

(65) Prior Publication Data

US 2007/0061380 A1    Mar. 15, 2007

(51) Int. Cl.
    *G06F 13/00* (2006.01)
(52) U.S. Cl. .................... 719/313; 719/314
(58) Field of Classification Search ............. 719/313, 719/314
    See application file for complete search history.

(56) References Cited

U.S. PATENT DOCUMENTS

| | | | |
|---|---|---|---|
| 6,817,018 B1 * | 11/2004 | Clarke et al. ............... | 719/313 |
| 6,920,635 B1 | 7/2005 | Lodrige et al. | |
| 7,020,480 B2 | 3/2006 | Coskun et al. | |
| 7,085,758 B2 * | 8/2006 | Barsness et al. ............. | 707/4 |
| 7,181,482 B2 | 2/2007 | Jain et al. | |
| 2004/0139166 A1 * | 7/2004 | Collison .................... | 709/207 |
| 2004/0240444 A1 * | 12/2004 | Matthews et al. ........... | 370/389 |
| 2006/0056413 A1 * | 3/2006 | Ikeda et al. ................ | 370/392 |
| 2007/0005800 A1 * | 1/2007 | Banks et al. ............... | 709/238 |
| 2007/0162511 A1 | 7/2007 | Venkatesan et al. | |
| 2007/0180297 A1 | 8/2007 | Byrne et al. | |

* cited by examiner

*Primary Examiner*—Andy Ho
(74) *Attorney, Agent, or Firm*—Hickman Palermo Truong & Becker LLP

(57) ABSTRACT

A method and apparatus for propagating and managing data, transactions and events either within a database, or from one database to another is provided. In one embodiment, messages are propagated from a source to a first queue and a second queue with the queues associated with the same database. The connection from the source to each queue maintains its own propagation job. This method could also be employed with cluster databases.

16 Claims, 5 Drawing Sheets

FINER GRAINED POINT-TO-POINT EVENT PROPAGATION

RELATED APPLICATIONS

The present application is related to the following U.S. patent application, the entire contents of which are incorporated herein by reference for all purposes:

U.S. patent application Ser. No. 11/224,770, filed on Sep. 12, 2005, entitled HIGH AVAILABILITY FOR DISTRIBUTED NON-PERSISTENT EVENT PROPAGATION, by Ramkumar Venkatesan, Krishnan Meiyyappan, Alan Downing and John W. Stamos.

FIELD OF THE INVENTION

The present invention relates to propagating and managing data, transactions and events either within a database, or from one database to another.

BACKGROUND

Complex database systems often need to propagate data, transactions and events within the database system's own database and also from one database to another. For example, a bank may need to transmit a financial transaction across several databases in order to maintain integrity in their records. As another example, a shipping company may need to send package tracking information across several systems in order to make this data available to its customers.

One method employed to transfer information in database systems is to use a data stream infrastructure. One such data stream infrastructure is described in U.S. Pat. No. 6,889,231, entitled "Asynchronous Information Sharing System", the entire contents of which are incorporated herein. Such data stream architectures use the publisher/subscriber model to propagate data and events in a data stream from sources to subscribed destinations ("targets"). The source and targets of a stream may be within the same database, or in different databases.

Typically, propagating information from a source to a target takes place via queues. Queues act as "post boxes" where different applications can look for "mail" in the form of messages. When a publisher (such as a database server or other application) wants to contact subscribers (such as other database servers or applications), the publisher can leave messages in these queues so that the subscribers will be able to find and retrieve these messages. Queuing also provides a unified framework for processing events.

Database Links

Propagation of events between queues on different databases happens through database links ("dblinks"). When a dblink is initialized, the user specifies a database. After the dblink has been set up, the dblink may then be used to establish connections with the specified database.

The same database link may be used to propagate messages from several source queues in one database to several target queues in another database. For example, a dblink may be established between a database X and a database Y. The dblink may be used to propagate messages from a source queue X1 in database X to queues Y1, Y2 and Y3 in database Y. The same dblink may be used to propagate messages from another source queue X2 in database X to queues Y4, Y5, and Y6 in database Y.

Queue-to-Dblink Jobs

The task of propagating messages from a source queue to one or more target queues is encapsulated in a "job". When a job is executed, the corresponding task is performed. For any given source queue, the task of propagating messages from that source queue over a particular dblink is encapsulated in a single job, regardless of how many target queues will be receiving messages from the source queue over that particular dblink. Thus, a single job would be used to propagate messages from source queue X1 to queues Y1, Y2 and Y3. A separate job would be used to propagate messages from source queue X2 to queues Y4, Y5 and Y6. The same dblink (between database X and database Y) may be used to propagate the messages of both jobs.

Because propagation tasks are encapsulated into jobs on a queue-to-dblink basis, the jobs are referred to herein as "queue-to-dblink" jobs. Queue-to-dblink jobs involve multiplexing when the messages from the source queue are propagated to multiple destination queues within the same destination database.

FIG. 1 is a block diagram illustrating a scenario of propagating information between databases using queue-to-dblink jobs. When a publisher has information to be sent, that information is placed in a source queue 101 of a database 100. In the illustrated example, the destination of that information is one or more target queues 151, 152, 153 located in a target database 150. The database 100 that includes source queue 101 and the database 150 that includes target queues 151, 152, 153 are connected via a dblink 130.

To perform the queue-to-dblink job of propagating messages from source queue 101 to target queues 151, 152 and 153, a sending process 102 located on the source database and a receiving process 154 located on the target database make the connections that allow for the delivery of messages. For each message in queue 101, the sending process 102 determines which of the target queues 151, 152, 153 are to receive the message, inserts into the message an indication of the appropriate destination queue(s), and sends the message to the receiving process 154 over dblink 130. The receiving process 154 reads the destination queue information from the message, and sends the message to the specified destination queue(s).

One consequence of managing the propagation at the queue-to-dblink level of granularity is that situations may arise in which, within the same queue-to-dblink job, (1) a problem prevents the delivery messages to one destination queue, but (2) messages continue to be successfully delivered to other destination queues. For example, assume that target queue 152 has failed. When messages are propagated from the source queue 101 using a queue-to-dblink job, the messages destined for target queue 152 will return as undeliverable. Even though target queue 152 is unable to accept messages, the delivery of messages to target queues 151 and 153 within the same schedule will not be affected.

Under these circumstances, if the queue-to-dblink job is not disabled, subsequent propagations will result in further undelivered messages destined for target queue 152, but target queues 151 and 153 will receive their messages. Resending such undelivered messages is not a straight-forward process, and may require the manual intervention of a database administrator. On the other hand, if the queue-to-dblink job is disabled, no further undelivered messages will result for target queue 152. However, after disabling the queue-to-dblink job, target queues 151 and 153 will cease to receive their messages.

Propagating to Buffered Queues in a Cluster

A "cluster" is a system in which multiple database servers have access to the same database. The database to which the multiple servers have access is referred to herein as a "cluster database". The persistent storage that stores a cluster database is accessible by all database servers in the cluster. In contrast, each database server has its own volatile memory that is not directly accessible to the other database servers in the cluster.

Queues can be persistent or buffered. A persistent queue is stored persistently. Since persistent storage is shared by all database servers in a cluster, persistent queues may be directly accessed by all database servers in a cluster. A buffered queue is stored in volatile memory. Consequently, even though a buffered queue is associated with a cluster database that is accessible to many database servers, the buffered queue itself may only be directly accessible to the database server in whose volatile memory the buffered queue resides (the "owner instance" of the buffered queue).

Propagating information to a buffered queue in a cluster environment presents a unique challenge because the messages destined for a buffered queue of a cluster database do not merely have to be delivered to the right database, but have to be delivered to the right database server instance (the database server-in whose volatile memory they reside).

FIG. 2 is a block diagram illustrating a scenario of propagating information to buffered queues within a clustered database system. When a publisher has information to be sent, that information is placed in a source queue 202 of source database 200. The shared data 252 is accessible to multiple database servers (instance 1, 2 and 3).

When the target is a clustered database system, dblinks are allocated on a source-to-target-instance basis. For example, dblink 206 is associated with the database 200 and instance 1 of the clustered database system. Thus, dblink 206 may be used to propagate messages from source queue 202 to one or more target buffer queues located on instance 1 of the target database 250, but cannot be used to propagate messages from source queue 202 to buffered queues in any other instance of cluster database system 250.

When events are propagated from a source queue to buffered queues in a clustered database using queue-to-dblink granularity, the instance that owns the buffered queues must be identified. The dblink is configured for connection from the source to the target buffer queue(s) by populating the dblink with various pieces of information, such as the hostname, port, username, and password, service name, and instance.

The service name is the name of the database, and the instance is the instance which owns the buffer queues that subscribe to the messages in the source queue. This information is typically entered by the user, and statically maintained by the dblink. In the system illustrated in FIG. 2, the user would specify database system 250 as the service, and instance 1 as the "instance".

Problems arise when events are propagated from a source to multiple buffer queues in a clustered database. Specifically, because each dblink is associated with a single database server instance, and the propagation job is allocated on a source-to-dblink basis, all of the target buffer queues of any propagation task must be located on the same database server instance. This limitation precludes effective load balancing between the database instances of the clustered database system. Further, if the database instance specified in a dblink configuration fails, then the buffer queues are automatically migrated to another alive instance in the cluster database. The user then needs to manually change the configuration of the dblink to the other instance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for propagating information in a queue-to-queue propagation mode is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for finer-grained point-to-point event propagation. Specifically, queue-to-queue jobs are used to propagate messages from a particular source (such as a source queue) to a particular destination queue. Each queue-to-queue job deals solely with propagating events between one source and one target queue. When messages are to be propagated to multiple destination queues, a separate queue-to-queue job is scheduled for each destination queue. Because each propagation job has its own propagation schedule, the propagation schedule of each queue-to-queue propagation can be managed separately. Even when multiple queue-to-queue propagations use the same dblink, each propagation job can be enabled, disabled, or altered independently of the other propagation jobs.

Queue-to-Queue Jobs

As mentioned above, a queue-to-queue job is a finer grained point-to-point propagation job than queue-to-dblink jobs previously employed for message propagation. A queue-to-queue job deals solely with propagating events between a source (such as a source queue) and a target queue. Because each source and destination queue pair has its own propagation schedule, the propagation schedule of each queue-to-queue propagation can be managed separately.

Figure 1:
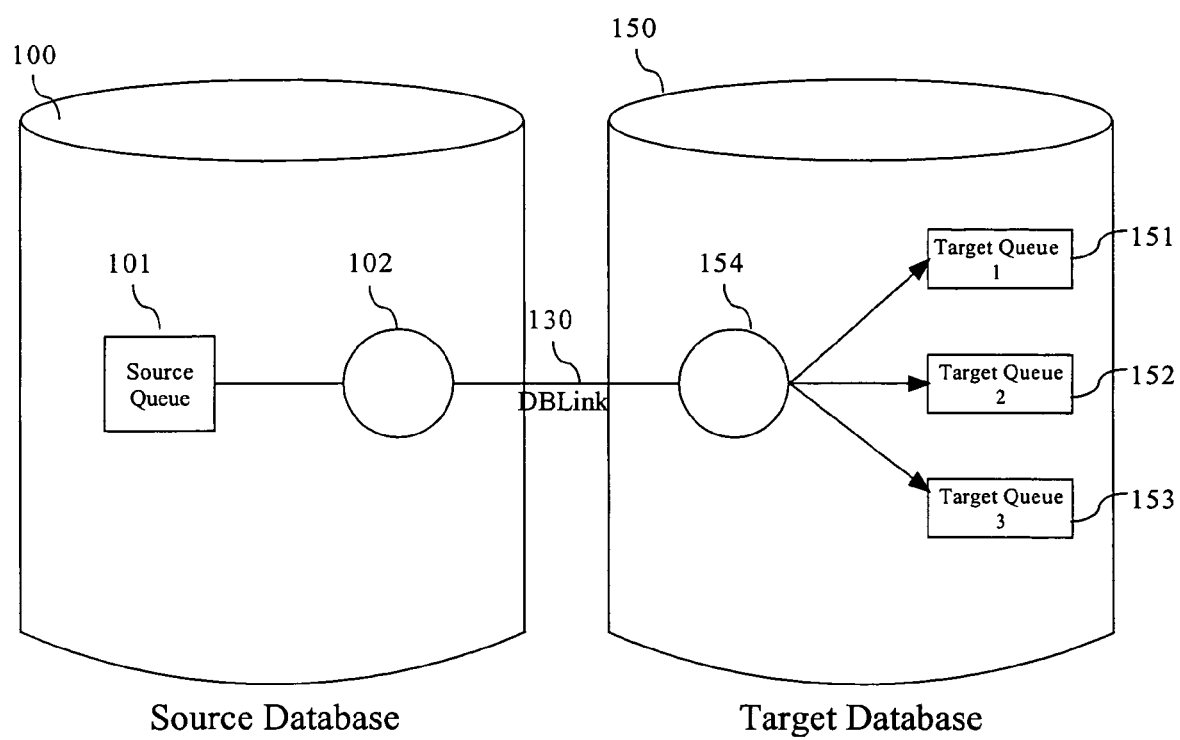
FIG. 1 is a block diagram that illustrates connecting a source queue to target queues using a queue-to-dblink job.
Figure 2:
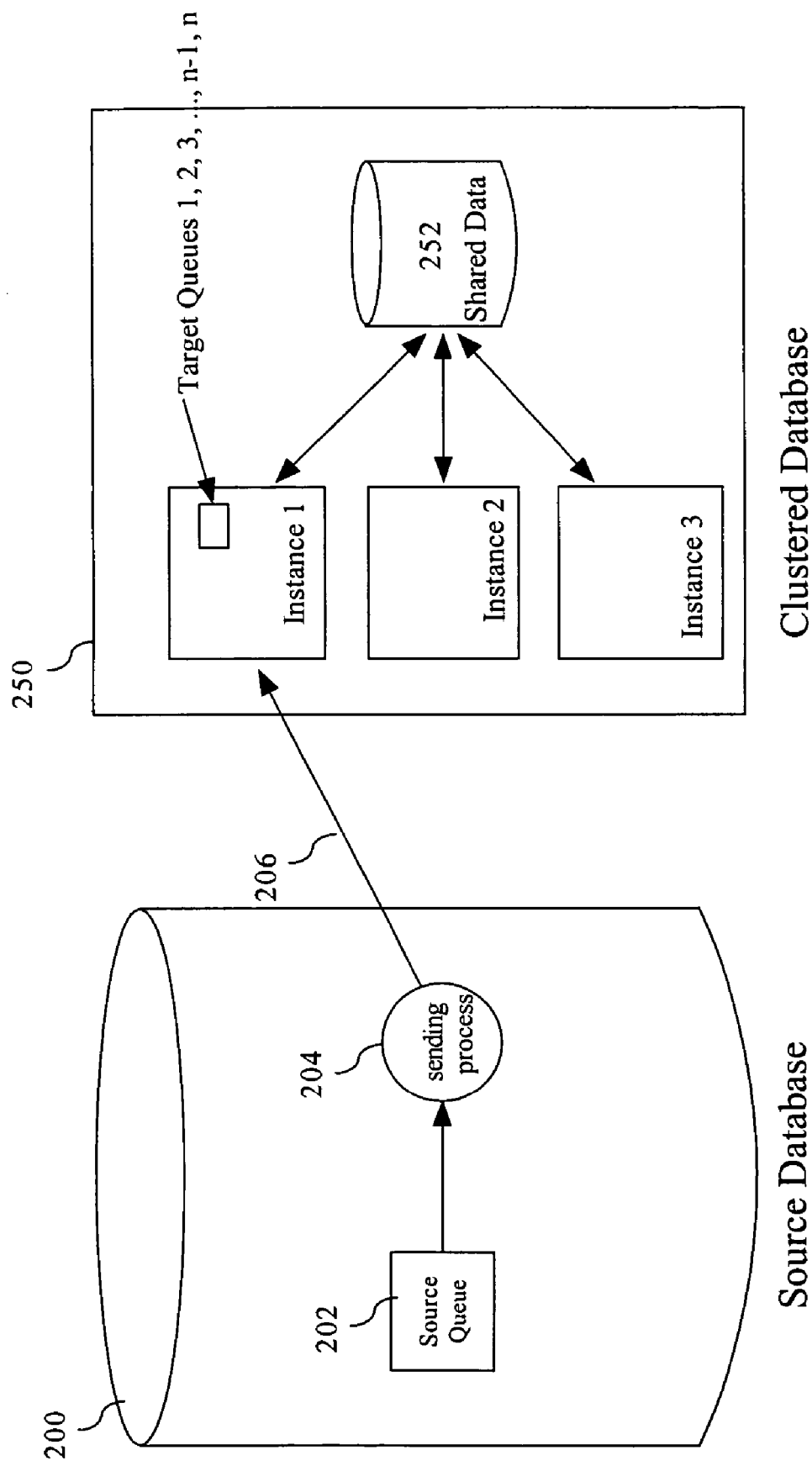
FIG. 2 is a block diagram that illustrates propagating information to buffer queues in a clustered database system using a queue-to-dblink job.
Figure 3:
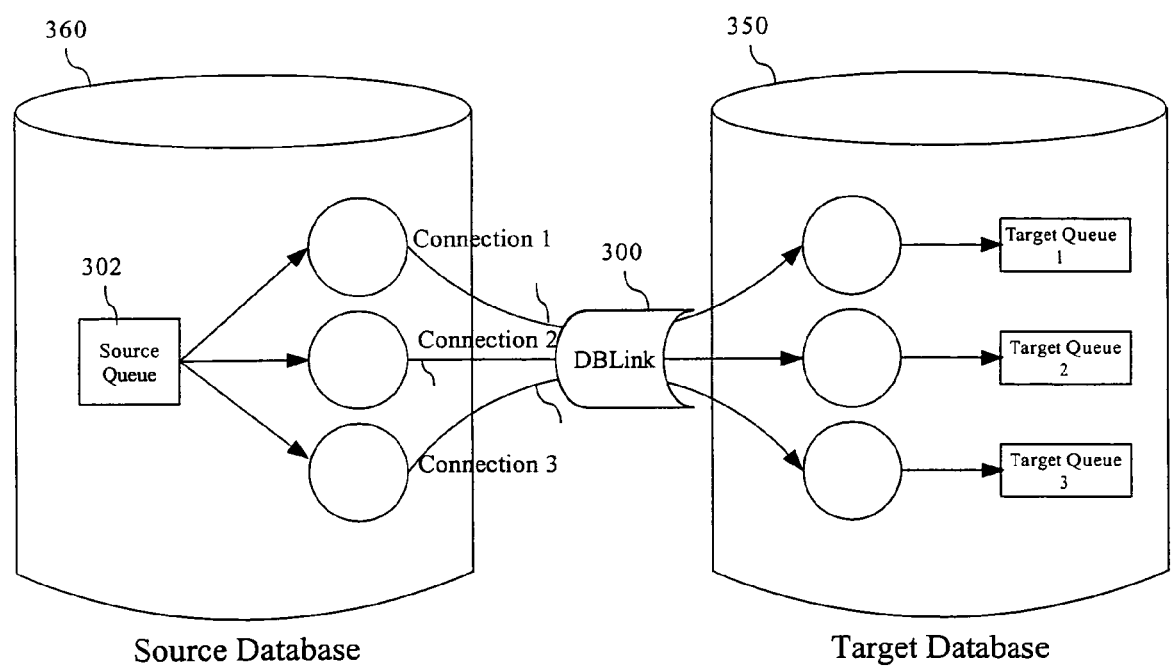
FIG. 3 is a block diagram that illustrates connecting a source queue to target queues using queue-to-queue jobs, according to an embodiment of the invention.

FIG. 3 illustrates one embodiment of the present invention. In the illustrated embodiment, information from the source database 310 must be propagated to the target database 350.

Specifically, message 1 must go to target queue 1 of the target database 350. Message 2 must go to target queue 2 of the target database 350. Message 3 must go to target queue 3 of the target database 350. In the illustrated embodiment, all of the data connections travel through a single dblink 300, though each connection is governed by the connections' own individual queue-to-queue propagation job. In another embodiment, the connections may all have their own dblinks. In contrast, if the granularity of the propagation schedule were at the queue-to-dblink level, a single propagation job would be responsible for sending all three messages.

Queue-to-Queue Connection Management

By managing the propagation of messages on a per-destination-queue basis, it is possible to disable propagation on a source-queue by destination-queue basis. Referring again to FIG. 3, assume that target queue 2 has failed and can no longer receive messages. With queue-to-queue jobs, the queue-to-queue propagation job of target queue 2 can be disabled without affecting the queue-to-queue propagation jobs for target queues 1 and 3. Because only the propagation job of target queue 2 is disabled, the messages slated for target queues 1 and 3 are not affected, and are delivered as normal. The problems associated with queue-to-dblink jobs, namely undeliverable messages when a job is pushed forward in spite of the failure of a destination queue, or disabling a job when some of the destination queues would be able to receive messages, will no longer occur.

Employing queue-to-queue propagation jobs allows a user to enable a connection after a target queue recovers from failure. Specifically, when a message is undeliverable using queue-to-dblink scheduling, a database administrator must manually handle the undeliverable messages once the queue is again enabled. However, in queue-to-queue propagation the job can be disabled before undeliverable messages accumulate. Consequently, no intervention is required by the database administrator in order for the messages to properly travel to the queue when the job is re-enabled after the problem is fixed.

Per-Destination-Queue Propagation Properties

When propagation tasks are encapsulated at the queue-to-queue level of granularity, the properties associated with those propagation tasks can also be specified at the per-destination-queue level of granularity. Those properties may include, for example, the priority assigned to the schedule, the latency assigned to the schedule, etc.

With respect to scheduling, different latency periods may be imposed on messages destined for different target queues. Referring again to FIG. 3, the task of propagating messages slated for target queue 1 is encapsulated in a different job than the task of propagating messages slated for target queue 2. Because these tasks are encapsulated in different jobs, different schedules may be assigned to the tasks. For example, the job for propagating messages slated for target queue 1 can be scheduled for once-per-day execution, while the job of propagating messages slated for target queue 2 can be scheduled to execute once per hour.

Queue-to-Queue Jobs for Buffered Queues in a Cluster Environment

As mentioned above, in a cluster database system, each buffer queue is only maintained in the volatile memory of a single database instance. By scheduling propagation jobs on a queue-to-queue basis, a single source is able to propagate messages to multiple buffered queues that reside in several instances of the same database cluster.

Figure 4:
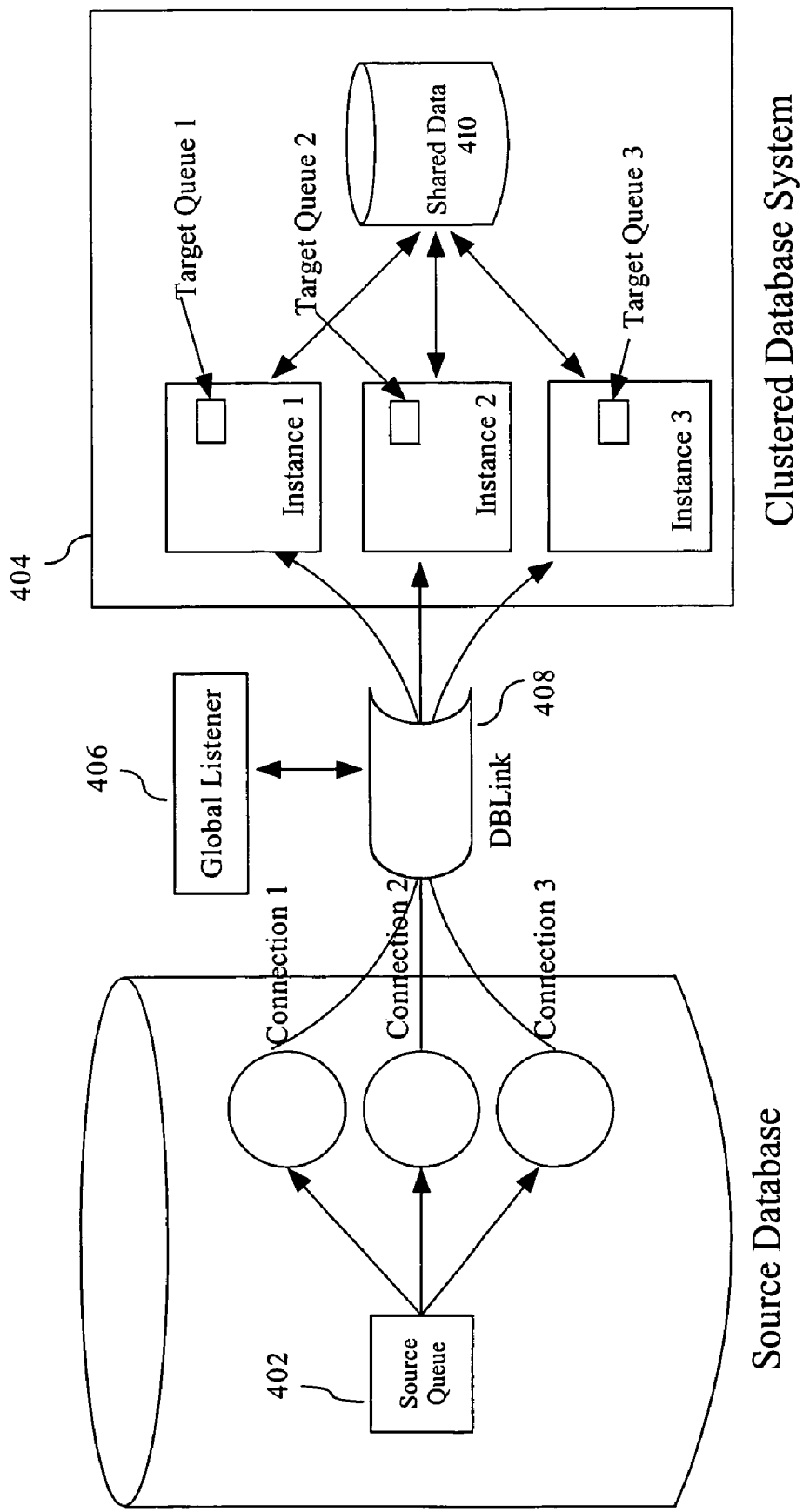
FIG. 4 is a block diagram that illustrates propagating information in a clustered database system with multiple instances using queue-to-queue jobs, according to an embodiment of the invention.

FIG. 4 is a block diagram that illustrates propagating messages from a source queue to a cluster database system 400, according to an embodiment of the invention. In cluster database system 400, several database server instances access shared data 410. In the illustrated embodiment, messages from source queue 402 are propagated to target buffer queues 1, 2 and 3 that reside in the volatile memory of different database servers of a cluster-database system 404.

For the purpose of illustration, it will be assumed that a message 1 must go to target buffer queue 1 owned by database server instance 1, a message 2 must go to target buffer queue 2 owned by database server instance 2, and a message 3 must go to target buffer queue 3 owned by database server instance 3.

In one embodiment, connections from a particular source to different database instances use separate dblinks. In such an embodiment, a first dblink would be used to propagate messages from source queue 402 to target queue 1. A second dblink would be used to propagate messages from source queue 402 to target queue 2. A third dblink would be used to propagate messages from source queue 402 to target queue 3.

Using a Single Dblink to Propagate to Queues on Different Instances

In the embodiment described above, connections from a particular source to different database instances use separate dblinks. In an alternative embodiment, dblinks are not tied to specific database instances. Consequently, the same dblink may propagate messages to buffer queues in different instances. Such an embodiment is illustrated in FIG. 4, where messages propagated from source queue 402 to target queues 1, 2 and 3 are propagated using the same dblink 408, even though target queues 1, 2 and 3 reside in the volatile memory of instances 1, 2 and 3, respectively.

According to one embodiment, queue-to-instance mapping information is maintained. For example, cluster database system 404 may maintain queue-to-instance mapping information that indicates that target queue 1 is owned by instance 1, target queue 2 is owned by instance 2, and target queue 3 is owned by instance 3.

When a connection is created for propagating messages from a source to a particular destination queue, data that identifies the destination queue is stored in association with the connection. For example, connection 1 is the connection created for sending messages from source queue 402 to target queue 1. Thus, the metadata associated with connection 1 identifies target queue 1 as the destination queue for the connection. Connection 2 is the connection created for sending messages from source queue 402 to target queue 2. Thus, the metadata associated with connection 2 identifies target queue 2 as the destination queue for the connection. Connection 3 is the connection created for sending messages from source queue 402 to target queue 3. Thus, the metadata associated with connection 3 identifies target queue 3 as the destination queue for the connection.

A global listener 406 may search the queue-to-instance mapping information based on the destination queue information associated with a connection to determine the specific database instance to which messages on the connection should be sent. In an implementation of this method, the user still configures the dblink 408, but does not specifying any particular instance. When a connection is initiated, the global listener 406 communicates to the dblink which instance owns the queue. Thus, locating the correct instance does not require any user intervention.

For example, the metadata associated with connection 2 identifies target queue 2 as the destination queue of connection 2. The queue-to-instance mapping may be searched to determine that target queue 2 is currently located on instance 2. Therefore, messages sent over dblink 408 on connection 2 are sent to instance 2. In contrast, the metadata associated with connection 3 identifies target queue 3 as the destination queue of connection 3. The queue-to-instance mapping may be searched to determine that target queue 3 is currently located on instance 3. Therefore, messages sent over dblink 408 on connection 3 are sent to instance 3.

By no longer requiring all non-persistent events to be relegated to queues located only on one database server instance, the database system can more effectively load balance the clustered database. For instance, assume there are 500 buffered queues on the clustered database with five database server instances. Queue-to-dblink propagation requires that all 500 buffered queues be owned by only a single database server instance. That one database server instance would have a significantly heavier workload with respect to the queues than the other four instances. Allowing queues to be placed on multiple instances, such as 100 queues on each of the five servers, would alleviate or eliminate the problem above and result in more efficient uses of system resources.

User Selection of Propagation Granularity

As explained herein, encapsulating propagation tasks at the finer queue-to-queue level of granularity insulates destination queues from any problems that may occur relative to other destination queues. The finer granularity of scheduling also allows for greater load balancing, by eliminating the need to assign all destination buffer queues within the same database instance. However, the coarser queue-to-dblink granularity may produce better results under certain conditions, such as when each message of the source queue is to be sent to several persistent queues within a single destination database.

Therefore, in one embodiment, the user is given the option of encapsulating propagation tasks on a queue-to-dblink basis, or on a queue-to-queue basis. The user may specify queue-to-dblink granularity for some propagation tasks, and queue-to-queue granularity for other propagation tasks. Thus, a database system can concurrently use both queue-to-queue propagation and queue-to-dblink propagation.

Hardware Overview

Figure 5:
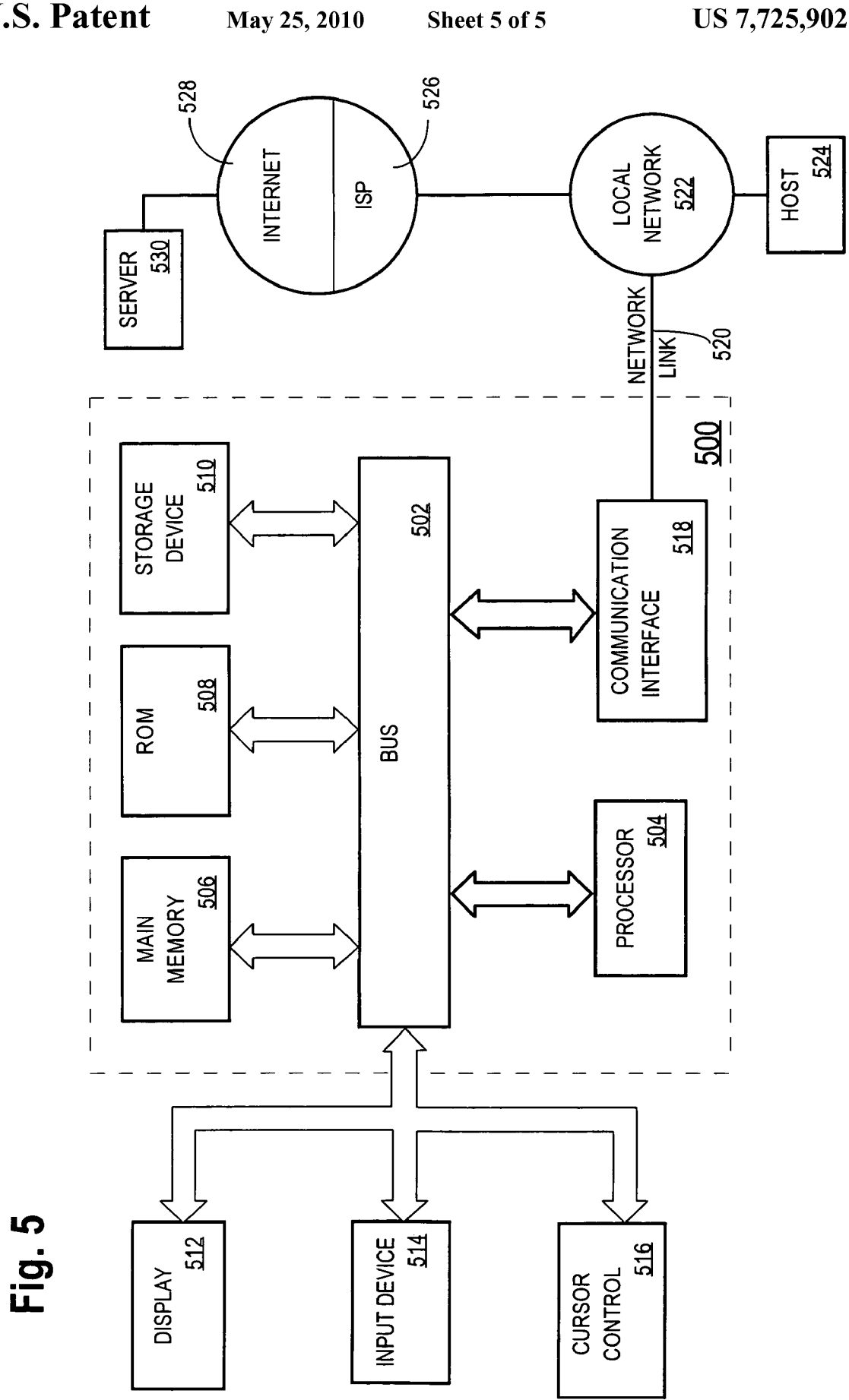
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein the machine-executed operation is at least one of:
   A) sending said instructions;
   B) receiving said instructions;
   C) storing said instructions onto a machine-readable storage medium; or
   D) executing the instructions;
   wherein said instructions are instructions which, when executed by one or more processors, cause one or more processors to perform the steps of:
   using a first queue-to-queue propagation job to transfer messages between a source queue and a first target queue via a first connection, wherein said first queue-to-queue propagation job is dedicated to transferring messages only between said source queue and said first target queue;
   using a second queue-to-queue propagation job to transfer messages between said source queue and a second target queue via a second connection, wherein said second queue-to-queue propagation job is dedicated to transferring messages only between said source queue and said second target queue; and
   wherein said first queue-to-queue propagation job is a different queue-to-queue propagation job than said second queue-to-queue propagation job.

2. The method as recited in claim 1, wherein:
   said first target queue and said second target queue are associated with a first database; and
   said source queue is associated with a second database that is different than said first database.

3. The method as recited in claim 1, wherein the messages that are propagated from the source queue to the first target queue and the messages propagated from the source queue to the second target queue are both propagated over a single dblink.

4. The method as recited in claim 1, wherein the messages that are propagated from the source queue to the first target queue and the messages propagated from the source queue to the second target queue are propagated over separate dblinks.

5. The method as recited in claim 1, wherein the instructions further include instructions for disabling the propagation of messages from the source queue to one of the first target queue and the second target queue without disabling the propagation of messages from the source queue to the other of the first target queue and the second target queue.

6. The method as recited in claim 1, wherein said first and second target queues are associated with a database, and wherein said database is a database to which multiple database servers, within a cluster of database servers, have access.

7. The method as recited in claim 6, wherein the database server that manages said first target queue is different from the database server that manages said second target queue.

8. The method as recited in claim 6, wherein the database server that manages said first target queue is the same database server that manages said second target queue.

9. The method of claim 1 wherein the first queue-to-queue propagation job has different properties than the second queue-to-queue propagation job.

10. The method of claim 9 wherein the first queue-to-queue propagation job has a different execution schedule than the second queue-to-queue propagation job.

11. The method of claim 9 wherein the first queue-to-queue propagation job has a different priority than the second queue-to-queue propagation job.

12. A method comprising performing a machine-executed operation involving instructions, wherein the machine-executed operation is at least one of:
   A) sending said instructions;
   B) receiving said instructions;
   C) storing said instructions onto a machine-readable storage medium; or
   D) executing the instructions;
   wherein said instructions are instructions which, when executed by one or more processors, cause one or more processors to perform the steps of:
   propagating messages from a source queue within a first database to a plurality of target queues associated with a second database, wherein messages from the source queue are transferred to each of the plurality of target queues using a separate queue-to-queue propagation job and a separate connection, and wherein each separate queue-to-queue propagation job is dedicated to transferring messages only between the source queue and one of the plurality of target queues; and separately storing the properties of each queue-to-queue propagation job.

13. The method of claim 12 wherein the plurality of target queues includes at least one buffered queue stored in the volatile memory of a first database server instance, and at least one buffered queue stored in the volatile memory of a second database server instance that is different than said first database server instance.

14. A system for propagating messages, the system comprising:

a first database;

a second database;

a source queue into which publishers store messages, wherein said source queue is associated with said first database;

a plurality of target queues from which subscribers retrieve messages, wherein the target queues are associated with said second database;

for each target queue of the plurality of target queues, a queue-to-queue propagation job that is dedicated to transferring messages only between the source queue and that target queue using a separate connection; and a separate sending process and receiving process for executing the queue-to-queue propagation job associated with each target queue.

15. The system of claim 14 wherein the messages are sent from the source queue to the plurality of target queues over a single dblink.

16. The system of claim 14 wherein the messages are sent from the source queue to the plurality of target queues over separate dblinks.

* * * * *

UNITED STATES PATENT AND TRADEMARK OFFICE
CERTIFICATE OF CORRECTION

| | | |
|---|---|---|
| PATENT NO. | : 7,725,902 B2 | Page 1 of 1 |
| APPLICATION NO. | : 11/224918 | |
| DATED | : May 25, 2010 | |
| INVENTOR(S) | : Krishnan Meiyyappan et al. | |

It is certified that error appears in the above-identified patent and that said Letters Patent is hereby corrected as shown below:

In column 6, line 11, delete "cluster-database" and insert -- cluster database --, therefor.

In column 9, line 16, delete "through-one" and insert -- through one --, therefor.

Signed and Sealed this
Ninth Day of August, 2011

David J. Kappos
*Director of the United States Patent and Trademark Office*